Dec. 20, 1949     L. FELDMAN     2,491,853
AQUARIUM
Filed March 10, 1948
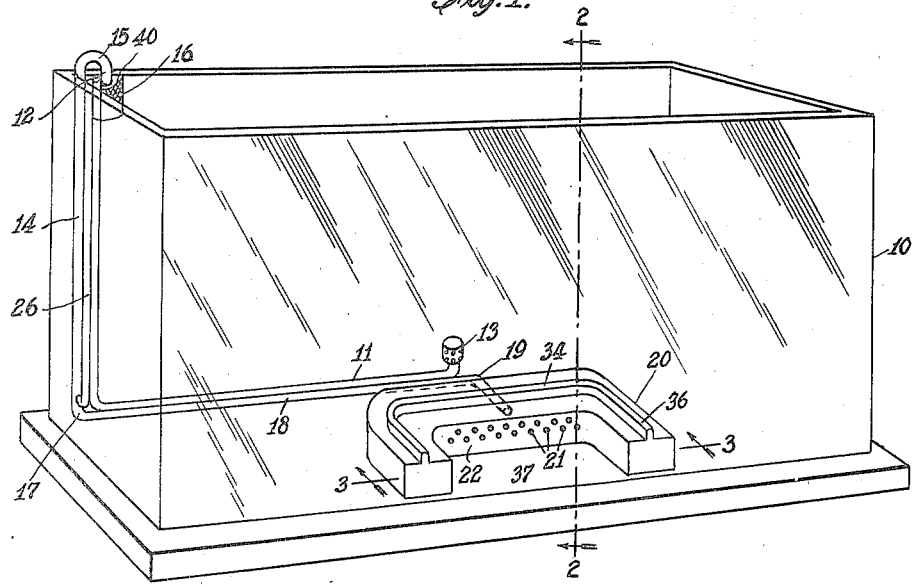
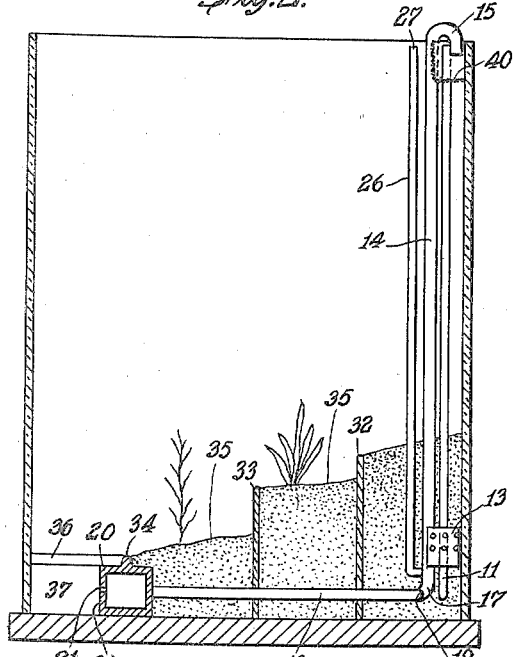
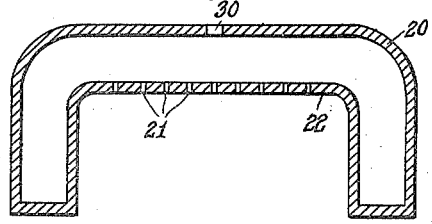
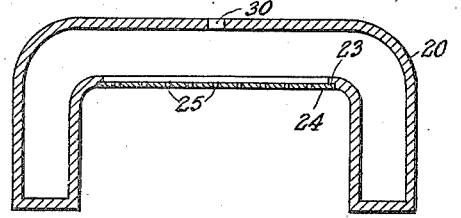
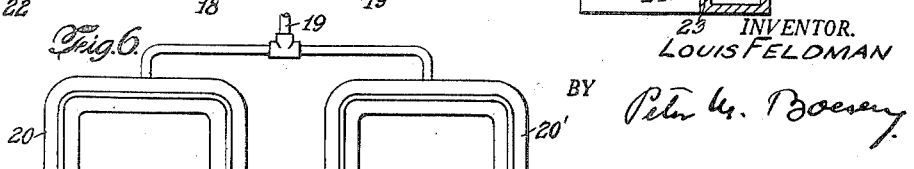
INVENTOR.
LOUIS FELDMAN
BY
ATTORNEY Patented Dec. 20, 1949

2,491,853

UNITED STATES PATENT OFFICE 2,491,853

AQUARIUM

Louis Feldman, New York, N. Y.

Application March 10, 1948, Serial No. 13,960

3 Claims. (Cl. 119—5)

This invention relates to means for automatic syphoning for purifying aquariums, and it has for its purpose to provide a device which due to its specific construction will permit the withdrawal of impurities, such as decayed rests of food, or other waste material deposited or resting in any inaccessible area, to be withdrawn automatically from the water in the tank of an aquarium, thereby preventing the pollution of such water, and thus conserving the life of the fish in the aquarium.

By the use of my said device, the water in an aquarium does not have to be changed or tank taken apart, as is now the case, and the danger of the frequent perishing of fish is thus avoided.

Another object of my device is to construct the same so that nothing will interfere with the continued and unimpaired operation of same.

Thus, I prefer to arrange the bottom partitions of the aquarium, that secures the gravel and plants in place, in a cascading manner with definite demarcated set-offs, whereby waste, or food particles, deposited in any inaccessible part of the interior, due, for instance, to the currents caused by fish swimming around, or air currents, created by the air stone will be forced to move from the highest plateau gradually to lower ones, and eventually settle in the space in front of the horse shoe-like apparatus, from where it is picked up by suction and carried into a strainer, adapted to arrest and hold said waste or particles.

The strainer is cleaned, or replaced, when necessary, while the water after leaving the strainer is left to flow down into a filter, where it is purified and neutralized.

The said apparatus has openings disposed a certain distance from the bottom of the latter as a protection against the possibility that accumulations of gravel and dirt should pile up to the extent of covering said openings.

Furthermore, the said apparatus is formed with an abutment at the top thereof to prevent the overflow of gravel into the space in front thereof.

In the event, however, of any clogging up of the suction means, which is most unlikely, all that would be necessary to do, is to stop the water from entering the straining system, whereby the process would reverse itself as the air pumped into the tube 26 would then cause the air and water to flush and clear the perforations, or intake area, of the suction means, of any substance or material that may have clogged the latter.

The aerator in my aquarium is preferably placed in the rear center portion relative to the suction means for the primary purpose of circulating the water so that any quantity of the latter will be subject to the suction process, thus creating an even temperature of the water in the aquarium.

As the device has no movable part there is nothing there that can interfere with the operation of same; in addition any vibration usually present in aquariums is eliminated.

With the above and other objects in view, this invention consists of the novel features of construction, combination and arrangement of parts, hereinafter fully described, claimed and illustrated in the accompanying drawings forming part of this application, and in which, similar characters of reference indicate corresponding parts in all views, and in which:

Figure 1 is a perspective elevational view of my invention with certain parts omitted for clarity.

Figure 2 is a transverse vertical section taken on the line 2—2 in Figure 1.

Figure 3 is a horizontal transverse sectional view of the U-shaped apparatus taken on the line 3—3 in Figure 1.

Figure 4 is a view similar to Figure 3 and showing a slight modification of my device.

Figure 5 is a detail view of the U-shaped apparatus; while

Figure 6 is an elevational view showing two apparatus of my device combined.

Referring more particularly to the drawings, the numeral 10 indicates the container for the water, 11 an aerator, having the usual intake of air 12, and outlet 13 in the water; a tube 14 has one end 15 bent and projecting into a strainer 40 and filter system 16, while said tube at its lower end is formed with a knee-bend 17 from which the tube 14 continues horizontal as indicated at 18, said portion 18 of the tube has a further bend 19 at the end thereof with the latter projecting into a hollow somewhat U-formed apparatus 20 by means of a hole 30 in the latter.

This hollow apparatus 20 is formed with a plurality of staggered perforations 21 upon its inner surface 22, the lowermost of these perforations are a suitable distance above the bottom in order that they may not be clogged up by slime or dirt.

Instead of the perforations 21 in the wall 20, said wall may be formed with a cut-out 23, and a detachable strip 24, formed with perforations 25 therein, inserted into said cut-out, as shown in Figures 4 and 5.

A tube 26, connected to an air pump (not shown), is connected to the tube 14 at about the knee-bend 17, in any suitable manner, so that air from the tube 26 may start a suction through the tube 14 from the perforations 21 or 25, respectively, in the U-shaped member and thus provide a steady flow of water mixed with impurities, or dirt through the tube 14 to the strainer 40 and filter 16.

The bottom or terrain of the container are formed with set-offs 32, 33, so as to substantially prevent the gravel 35 from over-flowing and covering the apparatus 20; the latter is, in turn, provided with a rim 34 terminating in extensions 36 at substantially right angles to the latter, to further assure that no gravel passes over the U-shaped apparatus, which is positioned close to the wall of the container, and should always have a clear space 37 in front of the apertures 21, or 25.

In Figure 6 the construction is as hereinbefore described, the only difference being that two apparatus, 20 and 20' are connected to the tube 19' in any convenient manner.

It is obvious that changes may be made in the form, construction and arrangement of the several parts, as shown, within the scope of the appended claims, without departing from the spirit of the invention, and I do not, therefore, wish to limit myself to the exact construction shown and described herein.

What I claim as new, and desire to secure by Letters Patent of the United States, is:

1. In a device of the class described, an aquarium having its bottom formed in a terrace-like manner, a U-shaped member arranged on the bottom of said aquarium with the ends of the wings adjacent a wall of the aquarium with the bight of the U-shaped member positioned adjacent the bottom of the terrace, said U-shaped member having an abutment centrally arranged at the top thereof and extending the full length of the latter, whereby to prevent anything but the conventional aquarium impurities from being deposited within the U-shaped member, said U-shaped member being formed with a plurality of staggered apertures upon its side nearest the wall and having an opening in the opposite side thereof, a tube having an outlet into a strainer and filter, the other end of said tube being connected to said opening in the U-shaped member, and an air inlet tube operatively associated with the first-mentioned tube and adapted to cause depositing of impurities in the U-shaped member for absorption by said filtering system.

2. In a device of the class described, an aquarium container comprising, in combination, a bottom formed with a plurality of terrace-like set-offs, and partitions supporting the latter, a U-shaped member having a hollow center portion and two wing portions integral therewith, said U-shaped member having the ends of the wing portions abutting a wall of the container, whereby to provide a substantially open space in front of its center portion, the latter being formed with perforations at the front and a hole at the rear thereof, an abutment centrally arranged on top of said U-shaped member, a tube inserted into said hole and having its other end terminate into a strainer and filter, and an air inlet tube operatively associated with the first-mentioned tube and adapted to cooperate with said filtering system, substantially as and for the purpose set forth.

3. In an aquarium container, an U-shaped member positioned on the bottom of the container having its wing portions disposed against a wall in the latter, an abutment centrally arranged upon the top of the U-shaped member and extending the full length of the latter, said U-shaped member being hollow and provided with perforations in the bight facing said wall and having a hole in the side opposite said perforations thereof adapted to receive a filtering tube.

LOUIS FELDMAN.

REFERENCES CITED

The following references are of record in the file of this patent:

UNITED STATES PATENTS

| Number | Name | Date |
|---|---|---|
| 44,876 | McKnight | Nov. 1, 1864 |
| 894,956 | Rogers | July 21, 1908 |
| 1,055,082 | Rogers | Mar. 4, 1913 |

FOREIGN PATENTS

| Number | Country | Date |
|---|---|---|
| 431,041 | Great Britain | June 28, 1935 |
| 849,043 | France | Aug. 7, 1937 |